May 20, 1947. L. T. MILLER ET AL 2,420,964
EXHAUST CONDUIT
Filed April 11, 1941 2 Sheets-Sheet 2
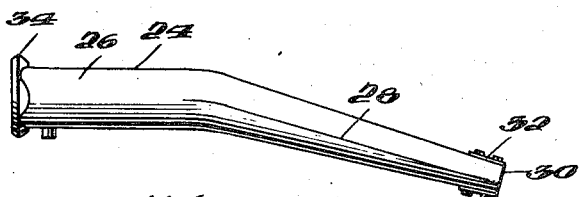
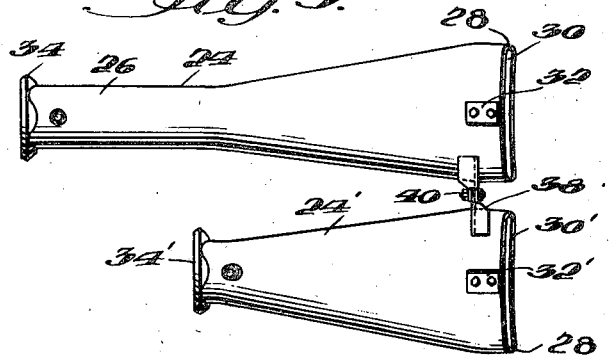
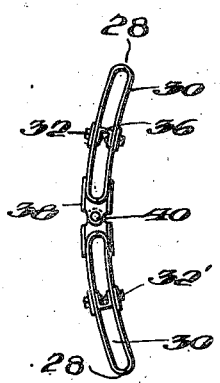
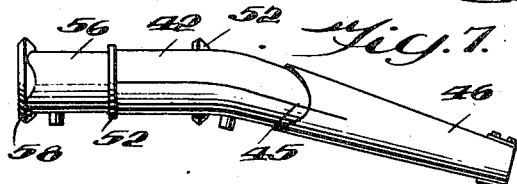
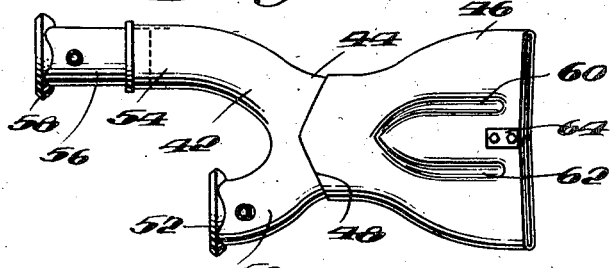
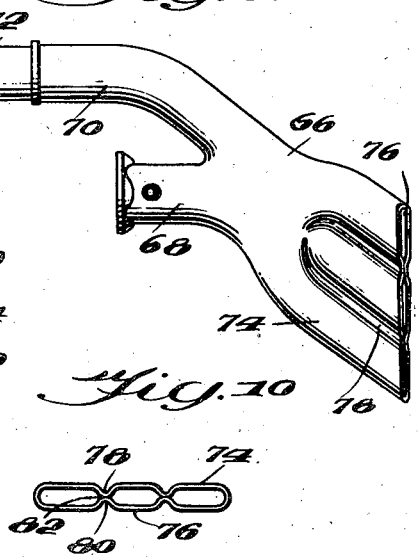
Inventors
Leslie T. Miller,
Benjamin T. Salmon,
Carl L. Zitza,
Attorney Patented May 20, 1947

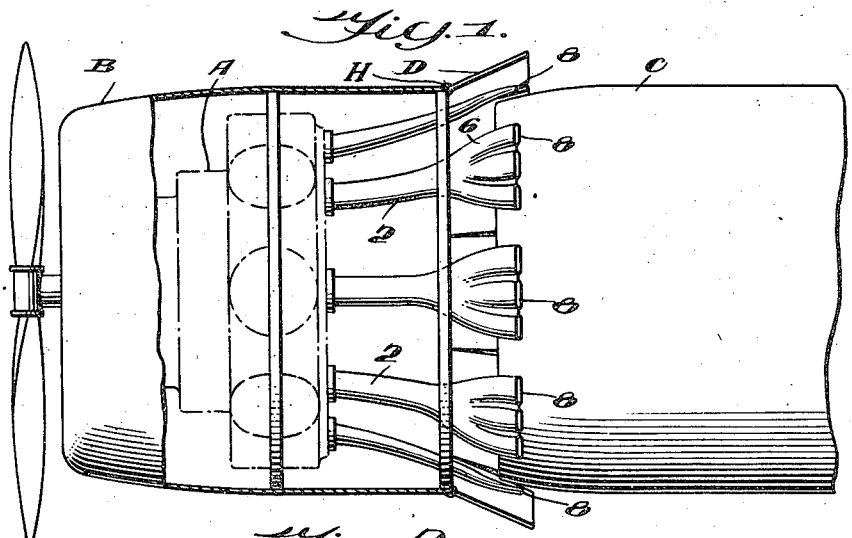
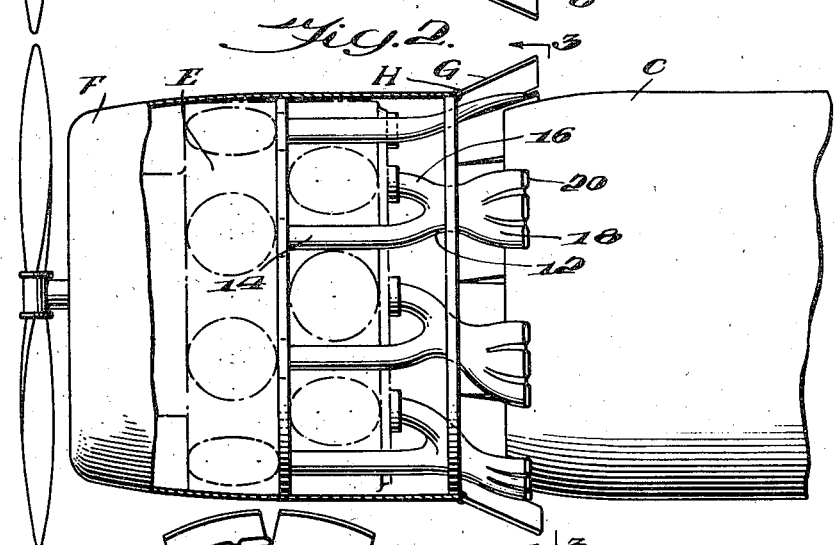
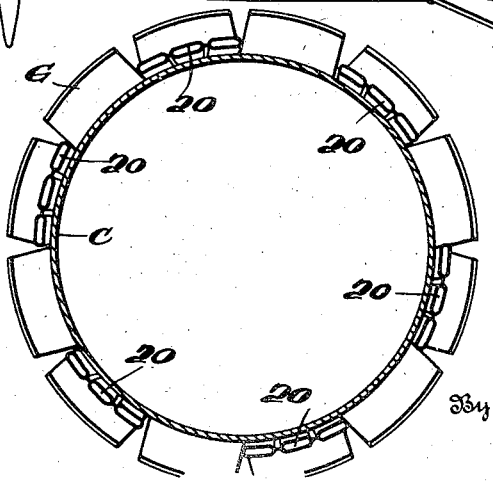

2,420,964

UNITED STATES PATENT OFFICE 2,420,964

EXHAUST CONDUIT

Leslie T. Miller, Stoneleigh, Benjamin T. Salmon, Towson, and Curt L. Zitza, Baltimore, Md., assignors to The Glenn L. Martin Company, Baltimore, Md.

Application April 11, 1941, Serial No. 388,098

7 Claims. (Cl. 60—29)

This invention is directed to the construction of exhaust conduits for internal combustion engines, and is more particularly directed to the construction of an exhaust system for a radial aircraft engine.

In aircraft engines it has been heretofore customary to connect the exhaust stacks of the various engine cylinders to a manifold which for a radial engine is in the form of a collector ring. From a collector ring, a conduit extends to a point where the gases are discharged into the atmosphere. The construction of manifolds and collector rings presents many difficult problems, and in addition, the presence of a collector ring takes up much space behind the engine and within the engine cowling. Moreover a collector ring does not serve any really useful function other than the collection of gases from the various cylinders into a common manifold.

It is an object of this invention to provide separate exhaust stacks for the individual, or groups of individual, cylinders in cylinder-in-line and radial engines.

Another object of the invention is to eliminate the conventional collector ring for a radial engine by discharging the exhaust gases substantially directly into the atmosphere.

Another object of the invention is to discharge the exhaust gases from a radial engine through the air outlet openings between the engine cowling and the engine nacelle so that the exhaust flames are effectively quenched and the streamlined surface of the cowling and nacelle is substantially unbroken.

Another object of the invention is to provide a simple means of exhausting gases from an aircraft engine in such a manner that the flames are quenched, and at the same time a degree of jet propulsion is obtained from the discharge of the gases.

Generally these objects of the invention are obtained by providing an exhaust stack for each cylinder of a radial aircraft engine. The exhaust stacks extend from a circular cross-section adjacent the exhaust ports of the cylinders, rearwardly of the engine to a flattened flared out section, the end of which projects slightly through the opening between the engine cowling and engine nacelle. By reason of the flared out construction at the discharge end of the exhaust stacks, the gases are distributed over a wide area into the relative wind, and the flames are thus effectively quenched. At the same time the streamlined shape of the cowling and nacelle is not materially disturbed and the discharge of gases rearwardly provides a degree of jet propulsion to aid in the forward propulsion of the aircraft. Another advantage exists in the elimination of the collector rings and all the troubles and problems attendant thereto. Because the collector ring has been eliminated the engine cowling can be made of shorter length. In double row radial engines the exhaust stacks of adjacent cylinders in the front and rear banks of cylinders can be conveniently combined into single discharge ends, with these ends positioned as above described.

The means by which the objects of the invention are obtained are more fully described with reference to the accompanying drawings, in which:

Fig. 1 is a diagrammatic view partly in section of a single row radial engine having the invention applied thereto;

Fig. 2 is a view similar to Fig. 1, but relating to a double row radial engine;

Fig. 3 is a cross-sectional view taken on the line 3—3 of Fig. 2;

Fig. 4 is a side view of an exhaust stack constructed according to this invention;

Fig. 5 is a plan view of a pair of individual exhaust stacks constructed according to this invention;

Fig. 6 is an end view of Fig. 5;

Fig. 7 is a side view of an exhaust stack adapted for a double row radial engine;

Fig. 8 is a plan view of Fig. 7;

Fig. 9 is a plan view of a modified form of the invention shown in Figs. 7 and 8; and Fig. 10 is an end view of Fig. 9.

In Fig. 1 a single row radial engine diagrammatically represented at A, is enclosed within an engine cowling B which extends rearwardly to, but spaced from, the engine nacelle C. Between cowling B and nacelle C are the conventional adjustable cooling opening gills D hinged at H, shown in partly open position. Each of the cylinders in engine A has attached to its exhaust port an exhaust stack 2 which extends from a circular cross-section adjacent the cylinder, to a flattened section 6 terminating in an outlet end 8 directed substantially to the rear of the aircraft. This outlet end 8 is positioned approximately in the plane of the surface of the cowling B and the plane of the surface of nacelle C, and adjacent the rearwardmost edges of gills D when they are in their closed position. The rear edges of the circumferential series of gills D constitute the trailing edge of the outer cowling B, a trailing edge which is to some extent adjustable. It is to be noted that ends 8 of stacks 2 are curved in conformity with the shape of the cowling and that they are spaced throughout their peripheries from both the outer cowling B and the inner cowling or nacelle C.

Gases from the cylinders of engine A are, in their passage through stack 2, distributed over a relatively wide area in their passage through section 6, and are discharged into the atmosphere in the form of a thin film. Due to the passage of the relative wind and because of the thinning out of the exhaust gases, any flames emitted from the stack are promptly extinguished. At the same time some reactive effect is caused by the high speed discharge of the gases so that some jet propulsion is obtained to aid in the forward propulsion of the aircraft. Gills D may be substantially closed so that at high speeds the circumferential opening receiving circulating air from the engine can be effectively regulated to control cooling, and neither the gills nor the exhaust stacks interfere with the streamlined shape of the cowling and the nacelle. As the conventional collector ring has been eliminated, the engine can be mounted closer to the end of nacelle C, thus making the cowling shorter in length. At the same time the construction of individual exhaust stacks is simple and inexpensive as compared to collector rings. The individual exhaust stacks 2 are rigidly mounted upon the engine block at the exhaust ports of the individual cylinders.

In Fig. 2 the invention is shown applied to a double row radial engine E surrounded by the conventional cowling F and attached to an engine nacelle C. In this construction the exhaust stacks 12 are provided with bifurcated ends of circular cross-section, the longer leg 14 being joined to the exhaust port of a cylinder in the forward cylinder bank, while the shorter leg 16 is rigidly connected to the exhaust port of a cylinder in the rearward cylinder bank. The two legs 14 and 16 of circular cross-section are combined and extend into a flattened section 18 terminating in an elongated discharge end 20. Ends 20 are positioned with respect to the engine cowling F, nacelle C and gills G exactly as described for the stacks 2 of Fig. 1.

The specific construction of the exhaust stacks is illustrated in Figs. 4 to 10, inclusive, the predominating features of which are the elements of simplicity and strength of the construction, together with reinforcing means. For an individual exhaust stack, the construction shown in Fig. 4 can be used in which a sheet metal tube 24, having one end 26 of circular cross-section, is split, flattened and welded together at 28 to form the flattened elongated discharge end 30. End 30 can be provided with reinforcing 32, as described in detail for Fig. 6. At the other end, a fitting 34 is provided for rigidly mounting the stack upon the engine block.

A plan view of stack 24 is shown in Fig. 5, and this stack has coupled therewith a stack of shorter length so that the two stacks together can be used for serving two cylinders of a double row engine as shown in Fig. 2. The reinforcing 32, Fig. 6, is achieved by a channel bracket 36 placed in the discharge end of the conduit and held there by the bolts as indicated. This channel bracket also serves to some extent as a baffle for distributing the flow of gases in the stack.

Except for being of shorter length, the stack 24' coupled to stack 24, is similar in all respects to stack 24, including the engine mounting means 34', discharge end 30' and reinforcing 32'.

Stacks 24 and 24' are coupled together at 38 by two brackets, each of which is welded to its respective stack, and coupled together in a pivotal joint by bolt 40. By reason of this pivotal joint the exhaust stacks can be adjusted to the curvature of the cowling surface, and furthermore, such a coupling provides a mutual support between the stacks.

In Figs. 7 and 8 a built-up construction is shown to provide a stack construction for use in the double bank radial engine illustrated in Fig. 2. The U-tube 42 has one side split and flared at 44 with the split reunited by welding 45, to form an opening to which an outwardly flared seamless nozzle 46 is united by welding 48. The shorter leg 50 of the U-tube 42 is provided with a fitting 52 adapted to be attached to the rearward bank of the double row engine, while the longer leg 54 is provided with an extension 56 and fitting 58 for attachment to the forward bank of the double row engine. As indicated in the drawings, the junction of the bifurcated portion comprising the legs 50 and 54 has a cross-sectional area equal approximately to the sum of the cross-sectional areas of these two legs. The seamless construction of nozzle end 46 provides greater strength. The strength characteristics of this nozzle 46 are increased by inwardly embossing opposite sides of the nozzle at 60 and 62, and uniting the ribs so formed by welding, as will be later described for Fig. 10. This construction also provides baffles interiorly of the nozzle so that the exhaust gases are better distributed for discharge in the shape of thin films. Additional reinforcement 64 similar to that shown at 32, Fig. 6, can also be provided.

In Fig. 9, a seamless lightweight stack construction is shown in which a seamless tube 66 is provided with two legs 68 and 70, the longer of which through fitting 72 is adapted to be attached to the forward cylinder bank, while the shorter leg 68 is adapted to be attached to the rearward cylinder bank. Section 74 is flattened from the circular sections 68 and 70 into a relatively elongated discharge end 76. Opposite surfaces of section 74 are embossed inwardly at 78 and 80 and the contacting edges are welded as by spot welding 82, so that both baffles and reinforcing are provided for the section 74.

In all the constructions shown, the exhaust gases are discharged adjacent the trailing edge of the engine cowling in a rearward direction and without perceptible white or yellow flames, and without an appreciable back pressure on the engine. The stacks can be constructed of sheet metal in the manner shown so that they give active or superior life to existing types of exhaust systems. Each discharge opening of relatively long and oval shape for each of the described stacks has an area not greater than 0.05 square inch per normal brake horsepower of the cylinder or the plurality of cylinders to which the stack is connected. The same form of construction can be adapted to cylinder-in-line engines with all of the advantages achieved with the radial engine.

Having now described the means by which the objects of the invention are achieved, we claim:

1. An exhaust stack for an internal combustion engine comprising a first end portion of circular cross-section adapted to be secured to an engine cylinder, a second end portion flared outwardly from said first end portion and flattened to form an elongated discharge orifice, and means for forming baffles in and for reinforcing said second portion, said reinforcing and baffling means comprising plates inserted in said flattened portion, a strap surrounding said flattened portion, and means uniting said plates, strap, and flattened portion.

2. In combination with a double row radial aircraft engine, a cowling for said engine, and a nacelle spaced from said cowling to form a cooling opening therebetween: a separate exhaust stack for and secured to each cylinder of said engine and extending therefrom into said opening, and pivotal connecting means joining the stacks of adjacent cylinders in different rows of cylinders, each stack having a flattened discharge end forming an elongated discharge orifice positioned substantially in the plane of said cowling.

3. An exhaust stack comprising a tubular member of thin sheet metal adapted to be connected to the exhaust port of an internal combustion engine at one end, said duct member being of substantially circular cross section at the engine end and faired to flattened elongated oval section adjacent the discharge end, the juxtaposed flattened walls of said duct having longitudinal internal corrugations therein extending from the discharge edge of the duct forwardly through the major portion of the flattened walls, said corrugations diminishing in depth at their forward ends and merging into the surfaces of the walls, and the bottom walls of the juxtaposed corrugations being welded together adjacent the discharge end of the stack, whereby said elongated oval section merges into a plurality of relatively small generally oval-shaped discharge ports, the length of the major axis of said generally oval-shaped discharge ports being about twice that of the minor axis.

4. A discharge stack comprising a duct member of thin sheet metal adapted to be secured to the cylinder of an internal combustion engine and receive exhaust gases directly therefrom, said duct member merging from substantially circular cross section at the point of connection to the cylinder into a relatively wide flat section adjacent the discharge end, and the opposite walls of said flat section being rigidly secured directly to each other at laterally spaced intervals along said discharge end, whereby said wide flat section merges into a plurality of generally oval-shaped discharge ports, the length of the major axis of said generally oval-shaped discharge ports being about twice that of the minor axis.

5. A discharge stack of thin sheet metal for use on a twin row radial engine, said stack comprising a pair of inlet tubes of substantially circular cross section, one adapted to be secured against the exhaust port of a cylinder in the rear row, and the other adapted to be secured against the exhaust port of an adjacent cylinder in the front row, said inlet tubes extending rearwardly and merging into a common throat member of oval cross section which extends rearwardly and becomes progressively wider and more flattened as it approaches the discharge end of said duct, the juxtaposed flattened walls of said oval section being interconnected at laterally spaced intervals along their discharge edges and defining a plurality of relatively small generally oval discharge ports into which said oval section merges, the length of the major axis of said discharge ports being about twice that of the minor axis, such that destructive vibration of the metal defining the edges of said ports is prevented.

6. An exhaust stack comprising a tubular member of thin sheet metal adapted to extend from the exhaust port of an internal combustion engine, said member having an inlet portion of substantially circular cross section merging into a portion of flattened cross section adjacent the discharge end, the juxtaposed flattened walls curving into engagement with each other at a plurality of laterally spaced points along the discharge end of the member and defining a plurality of relatively small generally oval discharge ports into which the flattened section merges, the length of the major axis of said discharge ports being about twice that of the minor axis, and means rigidly securing the engaging portions of said juxtaposed flattened walls directly to each other.

7. A discharge stack for an internal combustion engine comprising a duct member of thin sheet metal adapted to be connected at one end to the exhaust port of an internal combustion engine and having a cross-sectional shape merging from substantially circular at the engine end to a flattened, elongated oval shape adjacent the discharge end, the opposite, flattened walls at said discharge end being rigidly interconnected at laterally spaced intervals along the discharge end to define a plurality of relatively small generally oval discharge ports into which the elongated oval portion merges, the length of the major axis of said discharge ports being about twice that of the minor axis, such that destructive vibration of the metal defining the edges of said parts is prevented.

LESLIE T. MILLER.
BENJAMIN T. SALMON.
CURT L. ZITZA.

REFERENCES CITED

The following references are of record in the file of this patent:

UNITED STATES PATENTS

| Number | Name | Date |
|---|---|---|
| 1,757,783 | Schlesinger | May 6, 1930 |
| 2,177,642 | Fellers | Oct. 31, 1939 |
| 2,178,297 | Birkigt | Oct. 31, 1939 |
| 2,179,894 | Malczewski | Nov. 14, 1939 |
| 2,228,637 | Mercier | Jan. 14, 1941 |
| 2,244,594 | Amiot | June 3, 1941 |

FOREIGN PATENTS

| Number | Country | Date |
|---|---|---|
| 337,871 | Great Britain | Nov. 13, 1930 |
| 572,155 | France | Feb. 15, 1924 |